United States Patent [19]
McCain

[11] 3,940,184
[45] Feb. 24, 1976

[54] METHODS AND SYSTEMS FOR HYDRAULICALLY TRANSPORTING SOLIDS

[75] Inventor: David L. McCain, Ponca City, Okla.

[73] Assignee: Continental Oil Company, Ponca City, Okla.

[22] Filed: May 21, 1974

[21] Appl. No.: 471,871

[52] U.S. Cl. .................. 302/14; 302/42; 302/66; 417/43
[51] Int. Cl.² ................................. B65G 53/30
[58] Field of Search ................... 299/9, 18, 64; 302/14–16, 35, 42, 66; 137/4, 91, 92, 10; 417/43

[56] References Cited
UNITED STATES PATENTS

| | | | |
|---|---|---|---|
| 1,833,312 | 11/1931 | Allen | 302/14 |
| 2,791,471 | 5/1957 | Clancey et al. | 302/14 X |
| 3,389,938 | 6/1968 | Frazier | 302/14 |
| 3,514,217 | 5/1970 | Reiss | 302/15 X |

*Primary Examiner*—Evon C. Blunk
*Assistant Examiner*—Jeffrey V. Nase
*Attorney, Agent, or Firm*—William J. Miller

[57] ABSTRACT

Methods and systems for forming a particulated solids-carrier liquid slurry and transporting it through a conduit are provided wherein a continuous stream of carrier liquid is flowed into a sump, particulated solids to be transported are introduced into the sump so that a pumpable solids-carrier liquid slurry is formed therein, and the slurry is pumped out of the sump into a conduit for transport to a remote location. The flow rate of the stream of carrier liquid flowing into the sump is varied in inverse proportion to changes in the flow rate of particulated solids introduced therein so that the flow rate of slurry formed in the sump is maintained substantially equal to the flow rate of slurry pumped out of the sump.

13 Claims, 2 Drawing Figures

METHODS AND SYSTEMS FOR HYDRAULICALLY TRANSPORTING SOLIDS

BACKGROUND OF THE INVENTION

1. Field of the Invention

This invention relates generally to methods and systems for hydraulically transporting solids, and more particularly, but not by way of limitation, to methods and systems of apparatus for forming a particulated solids-carrier liquid slurry and transporting it through a conduit.

2. Description of the Prior Art

In the mining and transport of minerals such as coal as well as in other applications where it is required to transport solids to a remote location, hydraulic transport of the solids, i.e., forming the solids into a slurry and pumping the slurry through a conduit has heretofore been developed and used successfully. Generally, such hydraulic solids transportation systems have included a mixing tank wherein the solids to be transported, after being crushed to a desired size, are introduced and combined with a stream of carrier liquid to form a pumpable slurry. The slurry is continuously pumped from the tank through a conduit to a remote location. The flow rate of the slurry pumped through the conduit as well as the concentration of solids contained in the slurry have generally heretofore been uncontrolled, controlled manually, or partially automated, and problems have been encountered when the concentration of solids in the slurry becomes too high or the flow rate of slurry through the conduit too low in that either of these conditions will allow the solids to settle out of the slurry and deposit in the conduit. In order to overcome these problems, prior systems have often been operated using excess slurry flow rates with inefficient results.

In hydraulically transporting minerals such a coal from the working face in a mine to a terminus located either within the mine or outside the mine, problems associated with the control of the solids concentration in the slurry and the velocity of the slurry through the conduit in which it is being transported are acute. Because mining machines removing coal from the working face of a mine do not produce a constant flow of coal, when the coal is crushed and introduced into a sump wherein a coal-carrier liquid slurry is formed the concentration of coal in the slurry varies over a wide range, often from 0% to over 50% by volume. Heretofore, the flow rate of carrier liquid combined with the crushed coal to form the slurry has been controlled manually and the flow rate of slurry through the conduit transporting it to a remote location has varied, often leading to problems associated with plugging the conduit due to too high a solids concentration or too low a slurry flow rate.

By the present invention methods and systems for forming a particulated solids-carrier liquid slurry and transporting it through a conduit are provided wherein such problems associated with inadequate control of the solids concentration in the slurry and flow rate of the slurry through the transporting conduit are obviated.

SUMMARY OF THE INVENTION

The present invention relates to a method of forming a particulated solids-carrier liquid slurry and transporting it through a conduit comprising the steps of flowing a continuous stream of the carrier liquid into a sump at a flow rate such that when the maximum rate of the particulated solids to be transported is combined therewith a pumpable solids-carrier liquid slurry results, introducing the particulated solids to be transported into the sump so that the solids-carrier liquid slurry is formed therein, pumping the slurry out of the sump and through the conduit, and changing the flow rate of the stream of carrier liquid flowing into the sump in inverse proportion to changes in the flow rate of particulated solids introduced therein so that the flow rate of slurry formed in the sump is maintained substantially equal to the flow rate of slurry pumped out of the sump. Systems of apparatus for carrying out the methods of this invention are also provided.

It is, therefore, a general object of the present invention to provide improved methods and systems for hydraulically transporting solids.

A further object of the present invention is the provision of improved methods and systems for forming a particulated solids-carrier liquid slurry and transporting it through a conduit wherein changes in the flow rate of solids are automatically compensated for and the flow rate of slurry transported is maintained at a substantially constant level.

Another object of the present invention is the provision of improved methods and systems for forming a particulated solids-carrier liquid slurry and transporting it through a conduit wherein the concentration of solids contained in the slurry is automatically controlled at a substantially constant level.

Other and further objects, features and advantages of the invention will be readily apparent to those skilled in the art upon a reading of the description of preferred embodiments which follows taken in conjunction with the accompanying drawings.

DESCRIPTION OF THE PREFERRED EMBODIMENTS

The methods and systems of the present invention are useful in any application where it is desirable to transport particulated solids by suspending the solids in a liquid carrier and pumping the resulting slurry through a pipeline or conduit. However, the present invention is particularly suitable in the mining of coal or other minerals for continuously transporting the newly mined minerals in slurry form from the site of a mining machine within the mine to a terminus located either within the mine or outside the mine.

In conventional mining operations, the mined minerals are generally transported mechanically from the working face of the mine to a haulage system which transports the minerals to outside the mine. That is, the minerals are deposited by a mining machine into shuttle cars or other similar apparatus which convey the minerals a short distance to an endless conveyor belt or the like from where the minerals are further conveyed to a main line rail car system or a main line conveyor system. Because such conventional systems involve the mechanical loading and unloading of the mined minerals several times prior to when the minerals reach the desired terminal point, they generally cannot keep up with the production from modern continuous mining machines, and consequently, the mining machines cannot operate at maximum efficiency.

Recently, systems have been developed and used successfully which transport the mined minerals hydraulically from the location of the mining machine to a point of further processing within the mine or to a terminus outside the mine. Generally, these hydraulic systems include slurry preparation and pumping apparatus at or near the location of the mining machine. A crushing machine is generally provided which functions to particulate the raw solids to a particle size which can be suspended in a carrier liquid. The particulated minerals are introduced into a mixing tank wherein they are combined with a stream of carrier liquid and the slurry formed is pumped by way of a conduit, which may be a flexible hose, to a terminal point. At the terminal point the suspended coal is separated from the carrier liquid and the carrier liquid recycled. Heretofore, such systems for hydraulically transporting solids have been operated manually, i.e., the flow rates of the carrier liquid and quality of the slurry formed have been controlled manually.

By the present invention improved methods and systems are provided for forming a particulated solids-carrier liquid slurry and transporting it through a conduit wherein the solids concentration in the slurry and the slurry velocity through the transporting conduit are controlled automatically or semi-automatically.

Figure 1:
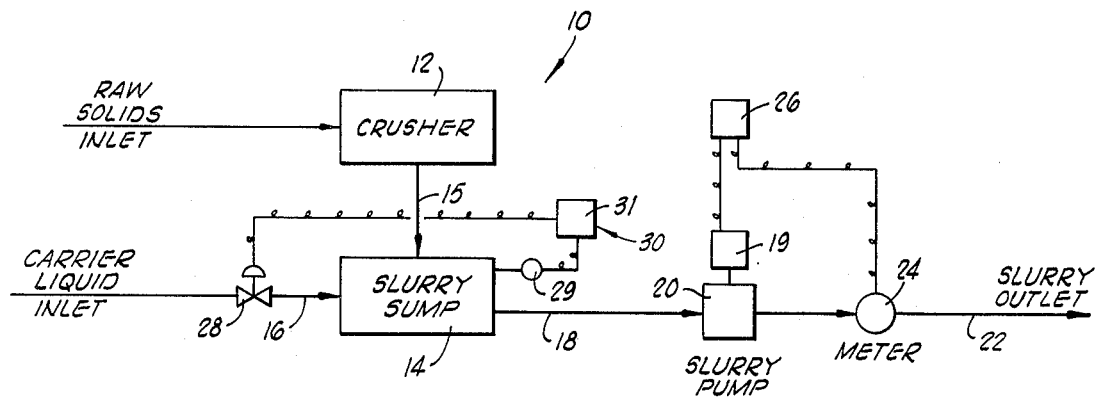
FIG. 1 is a diagrammatic illustration of one system of apparatus which can be employed for carrying out the methods of the present invention.

Referring to the drawings and particularly to FIG. 1, a system of apparatus of the present invention is illustrated and generally designated by the numeral 10. The system 10 includes a solids crusher 12 which receives raw solids from a source thereof, such as a continuous mining machine, and particulates the raw solids to a size such that they can be suspended in a carrier liquid, i.e., so that the maximum particle size produced can be formed with a liquid into a pumpable slurry. From the crusher 12 the particulated solids are conveyed by a conveyor 15 into a slurry sump 14. A conduit 16 for conducting a stream of carrier liquid into the sump 14 is connected thereto and to a source of carrier liquid which in mining applications is usually carrier liquid recycled from the terminal point where the solids are removed from the transported slurry. A conduit 18 for removing the particulated solids-carrier liquid slurry formed in the sump 14 is attached thereto and to the suction connection of a slurry pump 20. A conduit 22 is attached to the discharge connection of the pump 20 for transporting the slurry to the remote terminal location and a liquid flowmeter 24 for measuring the flow rate of slurry pumped through the conduit 22 is disposed therein. The meter 24 is operably connected to a conventional flow rate controller 26 which is in turn operably connected to a pump speed controller 19 attached to the pump 20. A flow control valve 28 is disposed in the conduit 16 which is operably connected to a liquid level control assembly 30. The liquid level control assembly 30 can be any of a number of conventional level control systems and includes a conventional level sensing device 29 attached to the slurry sump 14 which generates a control signal proportional to the rise and fall of the liquid level within the sump 14. A level controller 31 receives the control signal from the device 29 and generates a control signal inversely proportional thereto which operates the control valve 28.

Operation of the System 10

As stated above, the system 10 can be utilized in any of a variety of applications where solids are to be transported in slurry form and where it is desirable that the flow rate of slurry transported remain substantially constant. When the system 10 is utilized in mining operations wherein a continuous mining machine is employed, the crusher 12, slurry sump 14 and slurry pump 20 can be located in a fixed position near the mining machine, but are preferably mounted on a portable vehicle which moves in concert with the mining machine. In this application, the crusher 12 is positioned so that raw solids produced by the mining machine are deposited directly into the crusher, and the conduits 16 and 22 are at least partially formed of flexible tubing so that the apparatus is free to move with the mining machine.

A continuous stream of carrier liquid is caused to flow by way of the conduit 16 into the sump 14 and particulated solids from the crusher 12 are conveyed into the sump 14 by way of the conveyor 15. As will be understood, the flow rate of solids conveyed into the sump 14 varies considerably depending upon various factors affecting the operation of the mining machine such as changes in the relative hardness of the solids being mined. The sump 14 is of a size and shape such that the particulated solids conveyed therein are combined with the stream of carrier liquid to form a pumpable slurry. The slurry formed is continuously withdrawn from the sump 14 by way of the conduit 18 and pumped by the pump 20 through the transporting conduit 22.

The level control assembly 30 senses the rise and fall of the liquid level within the sump 14 and produces a control signal inversely proportional thereto which urges the valve 28 disposed in the conduit 16 to a more open position when the level falls and to a more closed position when the level rises. As will be understood, the rate of the stream of carrier liquid flowing through the sump 14 by way of the conduits 16 and 18 is initially set by means of the controller 26 so that when the maximum flow rate of particulated solids is combined with the carrier liquid, a pumpable slurry results having a concentration of solids therein and a velocity through the conduit 22 such that the solids do not settle out and deposit in the conduit 22. Once the controller 26 has been set at this flow rate, changes in the flow of particulated solids conveyed into the sump 14 are automatically compensated for by the system 10 without changing the flow rate of slurry pumped through the conduit 22. That is, when the flow of particulated solids conveyed from the crusher 12 to the sump 14 is reduced or stopped, the level control assembly 30 senses a fall in the liquid level within the sump 14 and opens the valve 28 accordingly thereby increasing the flow rate of carrier liquid flowing into the sump 14 and maintaining the level within the sump 14 substantially constant and the flow rate of slurry formed therein equal to that being withdrawn by the slurry pump 20. When the flow of particulated solids conveyed into the sump 14 increases, the level controller 30 senses a rise in the liquid level within the sump 14 and causes the valve 28 to close an amount such that the rate of carrier liquid flowing into the sump 14 is reduced and the liquid level therein maintained substantially constant.

The pump 20 can be positioned at the location of the slurry sump 14 or various other pump arrangements can be utilized. For example, in mining applications, the pump 20 can be located at a terminal point within the mine with a smaller booster pump being located at the site of the slurry sump 14 and crusher 12.

Figure 2:
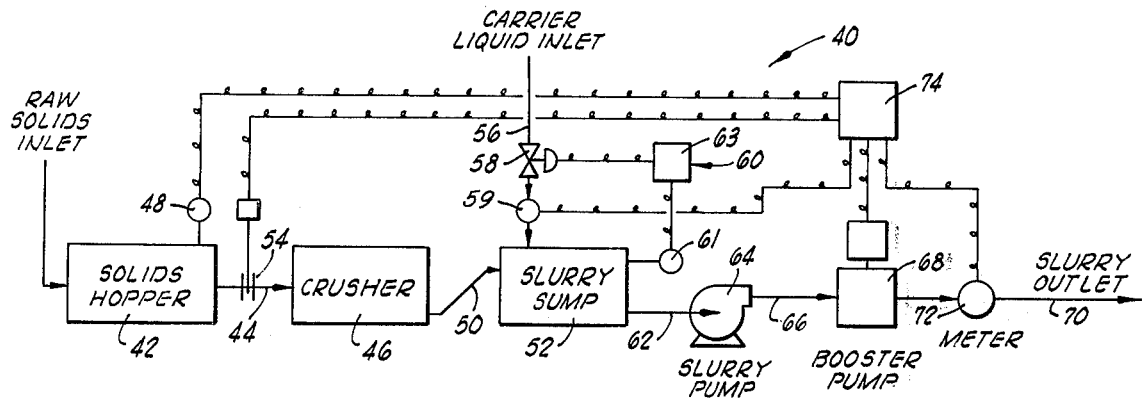
FIG. 2 is a diagrammatic illustration of an alternate system for carrying out the methods of the present invention.

Referring now to FIG. 2, an alternate system of the present invention is illustrated and generally designated by the numeral 40. The system 40 is similar to the system 10 and includes a solids accumulator or hopper 42 which receives raw solids from a mining machine or the like. A solids level sensing device 48 is attached to the hopper 42 which functions to generate a control signal directly proportional to the rise and fall of solids which accumulate in the hopper 42. From the hopper 42 the raw solids are conveyed by a conveyor 44 into a crusher 46. A conveyor 50 is attached to the crusher 46 for conveying solids therefrom into a slurry sump 52. A control signal actuated solids flow control device 54 is attached to the conveyor 44 for regulating the flow of solids conveyed from the hopper 42 to the crusher 46 and sump 52.

The slurry sump 52 is similar to the slurry sump 14 described above and includes a particulated solids inlet into which the conveyor 50 discharges, a carrier liquid inlet and a slurry outlet. A conduit 56 is attached to the carrier liquid inlet of the sump 52 and to a source of carrier liquid. A flow control valve 58 is disposed in the conduit 56 for controlling the flow rate of carrier liquid introduced into the sump 52. The control valve 58 is operably connected to a conventional liquid level control assembly 60 which includes a sensing device 61 attached to the sump 52 and a level controller 63. A conventional flowmeter 59 which generates a control signal directly proportional to the rate of the carrier liquid flowing through the conduit 56 is disposed in the conduit 56.

A conduit 62 is connected to the slurry outlet of the sump 52 and to the suction connection of a slurry pump 64. The discharge connection of the slurry pump 64 is connected by a conduit 66 to the suction connection of a slurry booster pump 68 and a conduit 70 for transporting the slurry to a remote point is connected to the discharge connection of the pump 68. A flowmeter 72 which generates a control signal directly proportional to the rate of slurry flowing through the conduit 70 is disposed in the conduit 70.

A central controller 74 for controlling the flow rate of slurry pumped through the conduit 70 by the pump 68 and the flow rate of particulated solids conveyed into the sump 52 is provided, the operation of which will be described in detail hereinbelow.

Operation of the System 40

As in the case of the system 10 described above, the system 40 can be utilized in a variety of applications. When used in conjunction with a continuous mining machine, the solids hopper 42, the crusher 46, slurry sump 52 and slurry pump 64 are preferably mounted on a portable vehicle which moves in concert with the mining machine. The booster pump 68 is preferably positioned a distance from the vehicle on which the apparatus is mounted with the conduit 66 being flexible to allow movement of the vehicle. As will be understood, however, the slurry pump 64 can be omitted and the booster pump 68 can be positioned at the location of the slurry sump 52, or, the booster pump 68 can be positioned at the terminus of the conduit 70 or several booster pumps can be positioned along the length of the transporting conduit 70.

A continuous stream of carrier liquid is caused to flow by way of the conduit 56 into the slurry sump 52 and particulated solids from the crusher 46 are conveyed into the sump 52 by means of the conveyor 50. The solids are mixed with the carrier liquid within the sump 52 and the resulting slurry is withdrawn therefrom by way of the conduit 62 and the pump 64. From the pump 64 the slurry flows by way of the conduit 66 into the suction of the pump 68, and from the discharge of the pump 68 the slurry is pumped through the transporting conduit 70.

The solids level sensing device 48 attached to the hopper 42 senses the rise and fall of solids accumulating in the hopper 42 and generates a control signal directly proportional thereto. This control signal is received by the central controller 74 which opens and closes the solids flow rate control device 54 attached to the hopper 42 in accordance therewith. That is, as the level of solids accumulating in the hopper 42 increases, the controller 74 opens the valve 54 thereby increasing the rate of solids conveyed to the crusher 46 and sump 52 and vice versa.

The level controller assembly 60 operates in conjunction with the flow control valve 58 to maintain the level of slurry formed in the sump 52 substantially constant. That is, the controller 63 generates a control signal inversely proportional to the rise and fall of the slurry level in the sump 52 which urges the valve 58 to more closed or open positions respectively, thereby decreasing or increasing the rate of carrier liquid flowing into the sump 52 and maintaining the flow rate of slurry formed in the sump 52 substantially equal to the flow rate of slurry withdrawn therefrom.

The controller 74, in addition to controlling the flow rate of solids conveyed into the sump 52 from the hopper 42, controls the flow rate of slurry pumped through the transporting conduit 70, i.e., the rate of slurry pumped by the pump 68, so that the volume concentration of solids in the slurry remains substantially constant. More specifically, the controller 74 receives the control signals generated by the flowmeters 59 and 72 which are directly proportional to the flow rates of carrier liquid and slurry respectively, and generates a value representative of the actual solids volume concentration in the slurry, i.e., the difference between the control signals representing the measurements of the slurry flow rate and carrier liquid flow rate divided by the control signal representing the slurry flow rate. The actual solids volume concentration so determined is compared by the controller 74 with a preset desired solids volume concentration and a control signal proportional to the difference is generated. This control signal is used to control the flow rate of slurry pumped by the pump 68 so that the volume concentration of solids in the slurry is maintained substantially constant.

In operation of the system 40, when the flow rate of particulated solids conveyed to the slurry pump 52 increases, the level controller assembly 60 and control valve 58 automatically decrease the flow rate of carrier liquid flowing into the sump 52 by way of the conduit 56. This in turn causes the slurry being removed from the sump 52 to have a higher solids concentration. The controller 74 senses the increase in solids volume concentration in the manner described above and automatically increases the flow rate of slurry pumped through the transporting conduit 70 accordingly. This increase in flow rate of slurry withdrawn from the sump 52 causes the level of slurry within the sump to fall which in turn causes the liquid level controller assembly 60 to increase the flow rate of carrier liquid introduced into the sump. The increase in carrier liquid flow rate reduces the concentration of the solids in the slurry to the desired level. The opposite of the above sequence occurs when the solids flow rate decreases.

Thus, by the method of the present invention as carried out in this system 40, the volume concentration of solids in the slurry formed is continuously automatically controlled at a substantially constant level even though the flow rate of solids entering the system varies over a relatively wide range.

As will be understood by those skilled in the art, the carrier liquid utilized may be any of a variety of liquids or compositions suitable for suspending the particulated solids to be transported. When the methods and apparatus of this invention are utilized in coal mining operations, the carrier liquid is preferably water or an aqueous solution containing additives to facilitate suspension of coal particles therein.

While presently preferred embodiments of the invention have been described for the purpose of this disclosure, numerous changes in the arrangement of components of the systems for carrying out the methods of the invention can be made by those skilled in the art which are encompassed within the spirit of this invention as defined by the appended claims.

What is claimed is:

1. A method of forming a slurry comprising particulate solids and a liquid carrier and transporting said slurry through a conduit comprising the steps of:
   a. flowing a continuous stream of said carrier liquid into a sump;
   b. introducing said particulated solids without fluid carrier into said sump so that a solids-carrier liquid slurry is formed therein;
   c. pumping said slurry out of said sump and through said conduit;
   d. measuring the flow rate through said conduit;
   e. adjusting the pump speed during the pumping of said slurry out of said sump by an amount responsive to said measurements of variations in said flow rate in said conduit in a manner to maintain said flow rate substantially constant; and
   f. changing the flow rate of said stream of carrier liquid flowing into said sump in inverse proportion to changes in the flow rate of particulated solids introduced therein so that the flow rate of slurry formed in said sump is maintained substantially constant.

2. The method of claim 1 wherein step (d) is further defined to include the steps of:
   sensing the rise and fall of the level of solids-carrier liquid slurry formed in said sump; and
   correspondingly decreasing or increasing the flow rate of said stream of carrier liquid flowing into said sump.

3. A method of forming a particulated solids-carrier liquid slurry and transporting it through a conduit comprising the steps of:
   a. flowing a continuous stream of said carrier liquid into a sump;
   b. introducing said particulated solids without fluid carrier into said sump so that a solids-carrier liquid slurry results;
   c. pumping said solids-carrier liquid slurry out of said sump and through said conduit;
   d. changing the flow rate of said stream of carrier liquid flowing into said sump in inverse proportion to changes in the flow rate of solids introduced thereinto so that the flow rate of slurry formed in said sump remains substantially equal to the flow rate of slurry pumped out of said sump; and
   e. changing the flow rate at which said slurry is pumped out of said sump and through said conduit in direct proportion to changes in the flow rate of particulated solids introduced into said sump so that the volume concentration of solids in said slurry remains substantially constant.

4. The method of claim 3 wherein the step (d) is further defined to include the steps of:
   sensing the rise and fall of the level of solids-carrier liquid slurry formed in said sump; and
   correspondingly decreasing or increasing the flow rate of said stream of carrier liquid flowing into said sump.

5. The method of claim 4 wherein step (e) is further defined to include the steps of:
   sensing increases or decreases in the volume concentration of particulated solids contained in said slurry and generating a physical signal directly proportional thereto; and
   changing the flow rate at which said slurry is pumped out of said sump and through said conduit in direct proportion to changes in said physical signal.

6. The method of claim 5 wherein the step of sensing increases or decreases in the volume concentration of particulated solids contained in said slurry and generating a physical signal directly proportional thereto is further defined to include the steps of:
   measuring the flow rate of said slurry pumped out of said sump and through said conduit;
   measuring the flow rate of carrier liquid flowing into said sump; and
   generating a physical signal directly proportional to the difference between the slurry flow rate measurement and the carrier liquid flow rate measurement divided by the slurry flow rate measurement.

7. The method of claim 3 wherein the particulated solids are crushed coal particles.

8. The method of claim 7 wherein the carrier liquid is an aqueous solution.

9. The method of hydraulically transporting coal through a conduit comprising the steps of:
   a. crushing said coal to form solid particles of a size capable of being pumped in slurry form;
   b. flowing a continuous stream of an aqueous carrier liquid into a sump;
   c. introducing said coal particles without fluid carrier into said sump so that a coal-aqueous carrier liquid slurry is formed therein;
   d. pumping said slurry out of said sump and through said conduit;
   e. sensing the rise and fall of the level of slurry formed in said sump;
   f. correspondingly decreasing or increasing the flow rate of said stream of aqueous carrier liquid flowing into said sump so that the flow rate of slurry formed therein remains substantially equal to the flow rate of slurry pumped out of said sump;
   g. measuring the flow rate of slurry pumped out of said sump and through said conduit;
   h. measuring the flow rate of aqueous carrier liquid flowing into said sump;

i. generating a physical signal directly proportional to the difference between the slurry flow rate measurement and the aqueous carrier liquid flow rate measurement divided by the slurry flow rate measurement; and j. changing the flow rate at which said slurry is pumped out of said sump in direct proportion to changes in the physical signal generated in accordance with step (i) so that the volume concentration of coal particles in said slurry remains substantially constant.

10. Apparatus for forming and transporting a particulated solids-carrier liquid slurry comprising:
   a. a slurry sump having a particulated solids inlet, a carrier liquid inlet, and a slurry outlet;
   b. a first conduit connected to the carrier liquid inlet of said sump and to a source of carrier liquid;
   c. liquid level control means attached to said sump for generating a signal inversely proportional to the rise and fall of the level of slurry formed in said sump;
   d. control valve means disposed in said first conduit and operably connected to said liquid level control means for adjusting the flow rate of carrier liquid flowing through said first conduit in accordance with said signal generated by said liquid level control means;
   e. a slurry pump having suction and discharge connections;
   f. a second conduit connected between the slurry outlet of said sump and the suction connection of said slurry pump;
   g. a third conduit connected to the discharge connection of said slurry pump for transporting said slurry to a desired remote location;
   h. means attached to said third conduit and to said first conduit for measuring the volume concentration of solids in said slurry pumped through said third conduit and generating a signal directly proportional thereto; and
   i. means for receiving said signal proportional to the volume concentration of solids in said slurry and changing the flow rate of slurry pumped out of said sump and through said third conduit in accordance with changes in said signal operably connected to said slurry pump.

11. The apparatus of claim 10 wherein the means for measuring the volume concentration of solids in said slurry and generating a signal directly proportional thereto comprises:
   a first flowmeter disposed in said first conduit for measuring the flow rate of carrier liquid flowing through said first conduit and generating a first signal directly proportional thereto;
   a second flowmeter disposed in said third conduit for measuring the flow rate of slurry flowing therethrough and generating a second signal in direct proportion thereto; and
   control means for receiving said first and second signals and generating a third signal directly proportional to the difference between the first and second signals divided by the second signal.

12. The apparatus of claim 11 wherein said particulated solids are crushed coal particles.

13. The apparatus of claim 11 wherein the carrier liquid is an aqueous solution.

* * * * *